United States Patent
Ropertz et al.

(10) Patent No.: US 7,624,958 B2
(45) Date of Patent: Dec. 1, 2009

(54) FASTENING BLOCK FOR MOUNTING OBJECTS ON A PROFILED RAIL

(75) Inventors: Frank Ropertz, Baden-Baden (DE); Lothar Merkel, Iffezheim (DE); Reinhard Pfeuffer, Elchesheim-Illingen (DE)

(73) Assignee: Maquet GmbH & Co. KG, Rastatt (DE)

( * ) Notice: Subject to any disclaimer, the term of this patent is extended or adjusted under 35 U.S.C. 154(b) by 0 days.

(21) Appl. No.: 10/479,357

(22) PCT Filed: Sep. 17, 2002

(86) PCT No.: PCT/EP02/10438

§ 371 (c)(1),
(2), (4) Date: Dec. 2, 2003

(87) PCT Pub. No.: WO03/028612

PCT Pub. Date: Apr. 10, 2003

(65) Prior Publication Data

US 2004/0144905 A1    Jul. 29, 2004

(30) Foreign Application Priority Data

Sep. 27, 2001   (DE) ............................... 101 47 588

(51) Int. Cl.
*A47B 96/00* (2006.01)
(52) U.S. Cl. .................. 248/231.51; 248/226.11
(58) Field of Classification Search ........... 248/226.11, 248/283.1, 227.1, 227.2, 227.4, 231.31, 231.61, 248/231.71, 231.85, 231.51, 214, 215, 274.1, 248/276.1, 282.1, 229.23, 229.14, 228.4, 248/228.5, 229.24, 229.13; 24/513, 514; 269/238
See application file for complete search history.

(56) References Cited

U.S. PATENT DOCUMENTS 4,373,414 A * 2/1983 Agius .......................... 83/414

(Continued)

FOREIGN PATENT DOCUMENTS

| DE | 3149215 A1 | 6/1983 |
| DE | 29922147 U1 | 3/2000 |
| FR | 1477088 A | 4/1967 |

*Primary Examiner*—A. Joseph Wujciak, III
(74) *Attorney, Agent, or Firm*—McDonnell Boehnen Hulbert & Berghoff LLP

(57) ABSTRACT

The invention relates to a fastening block for mounting objects on a profiled rail (12) having an at least approximately rectangular cross-section. The fastening block comprises a housing part (14) with at least one claw (26), which is fixed to the housing and reaches over the profiled rail (12) so that the housing part (14) rests against two faces of the profiled rail (12) via contact surfaces that are parallel to the profiled rail (12). The fastening block also comprises an L-shaped moving clamping part (28) which, with its first L-limb (30), is mounted on the housing part (14) in a manner that permits it to pivot about a first axis (32) that is parallel to the contact surfaces and which is pretensioned into a clamping position in which it reaches around the profiled rail (12) with its second L-limb (34) provided in the form of a claw. Lastly, the fastening block comprises a tightening device (40, 46, 72) for tightening and blocking the clamping part (28) in the clamping position. A draw rod (40) is coupled to an actuating extension (36) of the first L-limb (30) of the clamping part (28) in a manner that enables it to pivot about a second axis (38) that is parallel to the first axis (32), said actuating extension being aligned radial to the first axis (32). The draw rod extends approximately parallel to the second L-limb (34). The tightening device has a tightening screw (72) that is coupled to the draw rod (40) while being resistant to tensile forces and is directly or indirectly supported on the housing part (14).

6 Claims, 2 Drawing Sheets

U.S. PATENT DOCUMENTS 4,487,523 A * 12/1984 Monroe ..................... 403/385
4,796,846 A     1/1989 Meier et al.
5,538,215 A     7/1996 Hosey
6,622,980 B2 *  9/2003 Boucher et al. ........ 248/231.51

* cited by examiner

FASTENING BLOCK FOR MOUNTING OBJECTS ON A PROFILED RAIL

BACKGROUND OF THE INVENTION

The invention relates to a fastening block for mounting objects on a profiled rail with at least approximately rectangular cross section; it comprises a housing part with at least one housing-attached claw, which is intended for overlapping the profiled rail in such a manner that the housing part with application surfaces which are parallel to the profiled rail is applied against at least two surfaces of the profiled rail, a L-shaped movable clamp part which is attached with a first L leg on the housing part in a manner so it can be swiveled about a first axis which is parallel to the application surfaces and it is prestressed by means of a spring in a clamping position in which, with its second L leg which is designed in the form of a claw, it encloses the profiled rail, and a clamp device for clamping and stopping the clamp part in the clamping position.

A fastening block of the above-mentioned type is known, for example, from DE-A-31 49 219. Such fastening blocks are used, for example, for mounting accessory devices to an operating table. Care must be taken in the process to securely mount these accessory devices on the profiled rail, and to allow for the rapid and simple actuation of the fastening blocks.

In the known embodiment, the clamp part is attached to the cylindrical section of a bolt, which is eccentric with respect to the swivel axis, and which is connected in a torque-proof manner to an adjustment element. Because of this attachment of the clamp part, the latter can be swiveled not only with respect to the housing part, but also be moved vertically to a swivel axis. This allows the possibility of placing the fastening block with clearance on the profiled rail and then to pull the clamp part by a rotation of the bolt and with elimination of the clearance onto the profiled rail, so that a clearance-free seat of the fastening block on the profiled rail is ensured.

In the known fastening blocks, the housing part is integrally connected to the accessory part which is to be applied on the operating table, that is, for example, by welding. Because the bearing bolt for the clamp part extends through two parallel surfaces of the housing part, only relatively few surfaces are available on the housing part for connection with an accessory part. Moreover, the same fastening block cannot be connected as desired with different accessory parts.

BRIEF SUMMARY OF THE INVENTION

The invention is based on the problem of providing a fastening block of the type mentioned in the introduction, which can be used for multiple purposes, ensures a secure mounting on the profiled rail and can be actuated in a simple and rapid manner.

The problem is solved according to the invention by coupling a pull rod to an actuation projection which is directed radially toward the first axis and which belongs to the first L arm of the clamp part, about a second axis which is parallel to the first axis, where the pull rod extends approximately parallel to the second L leg, and by the fact that the clamp device has a clamping screw, which is coupled in a manner which allows tension to be applied to the pull rod and which is directly or indirectly braced on the housing part. The fastening block according to the invention guarantees, just as does the fastening block known from DE-A-31 49 215, a secure mounting on the profiled rail, even without prestressing and stopping the clamp part. However, the solution according to the invention offers a greater reliability because the clamping screw cannot be sufficiently loosened by an accidental motion to allow the lifting of the fastening block from the profiled rail. In the known solution, in which the clamp part is clamped only by a 90° rotation of an eccentric bolt, the latter can be misadjusted due to an unintentional movement out of the clamping position into its release position, and thus the fastening block can be loosened. Furthermore, in the solution according to the invention the first L leg forms a two-arm lever, to one end of which the second L leg which is applied against a profile rail is attached, and with whose other end the pull rod engages. In connection with the thread gearing of the clamping screw, a very high clamp torque can thus be transferred to the clamp part in a simple manner. An additional advantage of the solution according to the invention consists in that the clamping device requires only one surface of the housing part, so that the other surfaces of the housing part are available for integral connection to an accessory part to be mounted.

In a preferred embodiment, the pull rod is coupled with a clamping sleeve, which can be axially shifted in a housing guide which is coaxial to the pull rod axis, which has, in a section which extends at least partially out of the housing part, a perforation which is oriented perpendicularly to its axis and which, at its axial external end, has a coaxial threaded bore which intersects the perforation, and into which a clamping screw provided with a handle engages.

The solution offers the possibility of introducing into the perforation of the clamping sleeve, a rod which is connected to the accessory to be mounted, and the possibility of not only clamping the clamp part with the clamping screw, but also including in the clamping the rod which is connected to the accessory part. In the process, the rod is pressed against the external end of the housing guide, which can be formed from a pipe section in which a recess which is open to the external axial end of the pipe section is formed, which is brought to a position so that it covers a part of the perforation cross section in the case of an axial shift of the clamping sleeve. The clamped rod thus not only passes through the perforation in the clamping sleeve, it also engages in the recess in the pipe section of the housing guide in such a manner that it is fixed in its position relative to the housing part.

The pipe section can be designed as a toothed ring, which is removably connected to the housing part and which presents, on its end which is turned toward the housing part, a toothing which engages with a counter toothing on the housing part. This allows a rotation of the pipe section relative to the housing part and thus a change in the position of an accessory part relative to the housing part of the fastening block, where, as a result of the engagement of the toothing and the counter toothing, a given position of the pipe section can be securely fixed.

It is preferred for the pull rod to present, at its free end, a head which is radially broader compared to the rod shaft, whose surface turned toward the rod shaft is designed in the form of a segment of a spherical surface and which is intended for application to a complementary shaped bearing surface of the clamping sleeve, which, like a ring, surrounds the pull rod. As a result, it is not only possible to rotate the clamping sleeve about the axis of the pull rod, for example, to change the adjustment of a clamped accessory part relative to the fastening block, one can also carry out a swivel motion of the pull rod relative to the clamping sleeve, because the pull rod, during an adjustment of the clamp part, performs not only a purely axial movement but also a swivel movement, whereas the clamping sleeve in the housing guide can only be shifted axially.

In a second embodiment of the fastening block according to the invention, which is intended for an integral connection of the housing part with an accessory part, the clamping screw is in a direct threaded engagement with the pull rod. For this purpose, the clamping screw, for example, surrounds a threaded sleeve which is rotatably braced on the housing part and provided with a handle, and which has an internal threading, in which the pull rod provided with an external threading engages. In order to allow, in this case as well, a simultaneous axial and swivel movement of the pull rod during the adjustment of the clamp part, the support surface of the threaded sleeve is advantageously formed as a segment of a spherical surface, which is applied against a complementary shaped bearing surface of the housing part.

Additional characteristics and advantages of the invention are obtained from the following description, which explains, in connection with the drawing in the appendix, the invention with reference to two embodiment examples.

DETAILED DESCRIPTION OF THE INVENTION

Figure 1:
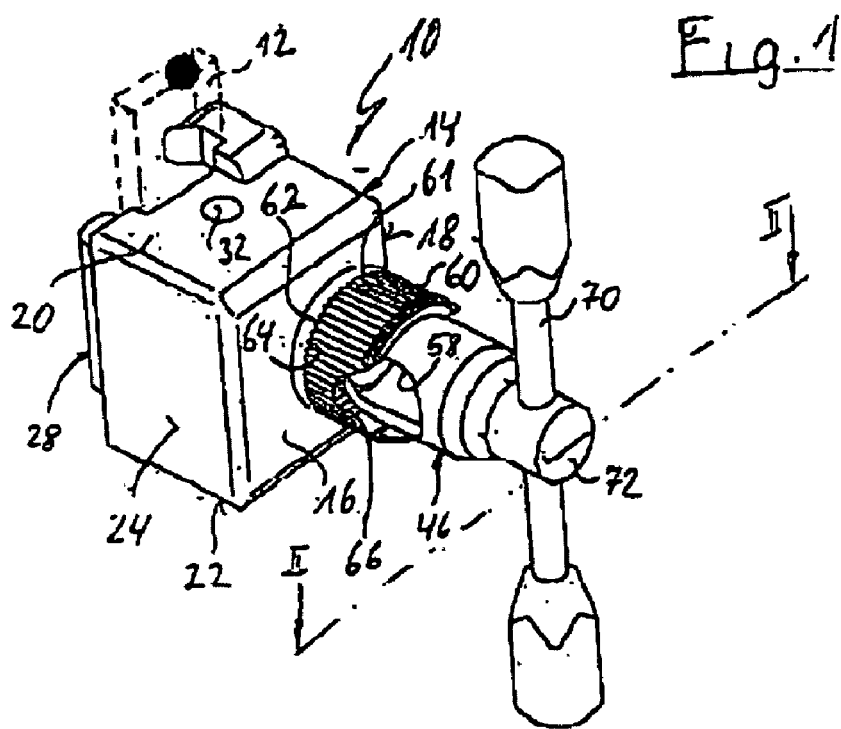
FIG. 1 shows a partially schematic perspective view of a first embodiment of a fastening block according to the invention.
Figure 2:
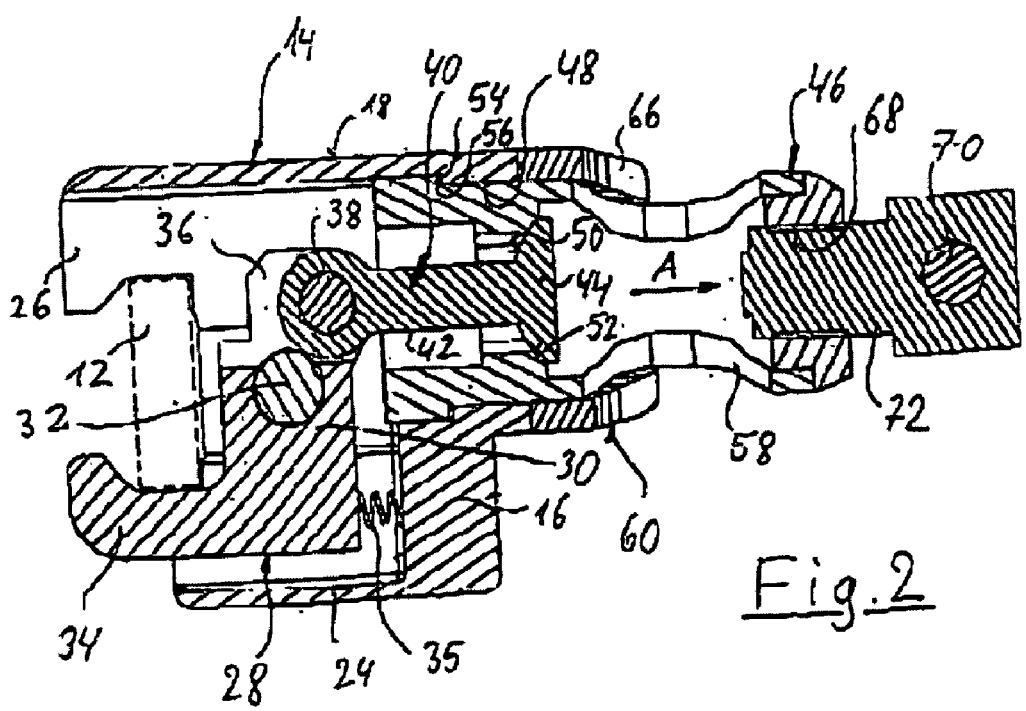
FIG. 2 shows a section through the fastening block along line II-II in FIG. 1, which section contains the axis of the clamping screw and is oriented perpendicularly to the swivel axis of the clamp part.

FIGS. 1 and 2 show a first embodiment of a fastening block bearing the general reference numeral 10, which can be attached on a profiled rail 12 which is indicated with a broken line and which has a rectangular cross section, where the profiled rail serves for the mounting of different accessory parts, not shown, on the profiled rail 12. The profiled rail 12 can be arranged, for example, along the patient's bedding surface of an operating table.

The fastening block 10 has an approximately cubic housing part 14 with a front side 16, a cover surface 18, side surfaces 20 and 22 as well as a floor surface 24. On the back side of the housing part 14, a housing-attached claw 26 is formed, which can overlap the profiled rail 12 in the manner represented in FIG. 2, when the fastening block is placed on the profiled rail 12. The housing-attached claw 26 is associated with a movable clamp part 28, which, in the representation of FIG. 2, has a L-shaped profile and which is attached, in a manner so it can be swiveled, with one of its L legs 30 to a shaft 32 which passes through the side walls 20 and 22. The other L leg 34, is also designed in the form of a claw and it grabs under the profiled rail 12, as can be seen in FIG. 2. The clamp part 34 is prestressed by a spring 36, which is braced, on the one hand, on the wall of the housing part 14 and, on the other hand, on the clamp part 28, in the clamping position represented in FIG. 2.

The first L leg 30 of the clamp part 28 has a projection 36 which projects above the shaft 32, to which a pull rod 40 is attached in a manner which allows swiveling about an axis 38 which is parallel to the shaft 32. The latter pull rod has a shaft 42, on whose free end, a head 44 is formed whose diameter is larger than that of the shaft 42. The pull rod 40 engages in a clamping sleeve 46, which is coaxial to it, and which is led in a manner so it can be axially shifted in a guide 48 formed in the front wall 37 of the housing part 14. The head 44 of the pull rod 40 has, on its bottom side which is turned toward the axis 38, a segment of a spherical surface 50, and it lies against a complementarily shaped bearing surface 52, which concentrically surrounds the pull rod 40, and which is formed inside the clamping sleeve 46. The clamping sleeve 46 can freely rotate inside the guide 48 of the housing part 14 about its axis and it can be shifted in the axial direction, where the axial movement in the pull out direction, that is in the direction of the arrow A in FIG. 2, is limited by the abutment of an end section 54, with larger diameter, of the clamping sleeve 46 on a step 56 in the guide 48.

The clamping sleeve 46, in its area which at least partially extends out of the guide 48, presents a perforation 58 which extends perpendicularly to the longitudinal axis of the clamping sleeve 46 and through which a mounting rod of an accessory part, not shown, which is to be clamped in can be inserted. The external part of the guide 48 is formed by a toothed ring 60, which can be axially shifted on the clamping sleeve 46 and which is connected in a torque-proof manner with the clamping sleeve 46 by a radial pin 61, which engages in an axis-parallel groove of the clamping sleeve 46, and which, on its axial end turned toward the housing part 14, presents a toothing 62 which is in engagement with a counter toothing 64 formed on the housing part 14. Furthermore, the toothed ring 60, on its axial end which is turned toward the housing part 14, presents a recess 66 which is designed in such a manner that it can be brought in a position where it covers a part of the cross section of the perforation 58, as shown in particular in FIG. 1. Thus, a rod which is inserted into the perforation 58, also partially engages in the recess 66.

At its end which is far from the housing part 14, the clamping sleeve 46 has a threaded bore 68 which is coaxial to the longitudinal axis of the clamping sleeve 46, into which a T-screw 72 is screwed, which is connected to a bar 70.

During its use, the fastening block 10 is placed transversely from above with the claw 26 formed on the housing part 14 on the profiled rail 12. The claw shaped second L leg 34 of the clamp part 28 is then in a position applied on the profiled rail 12. As a result of the geometric arrangement of the clamp part 28, a torque is generated which swivels the clamp part 28 in the opening direction when the placed fastening block 10 is pressed downward in its horizontal position. The clamp part 28 is then opened and finally it snaps over the bottom margin of the profiled rail 12 in the position represented in FIG. 2. When the clamp part 28 encloses the profiled rail, the closure of the claws 26 and 34 on the profiled rail 12 is supported by the spring or springs 36, by means of which the clamp part 28 is clamped against the profiled rail 12. In this situation already, torques of any magnitude within the range of admissible loads acting about any of the axes can no longer loosen the generated closure. Thus, one safety factor is already provided in the condition without clamping.

If an accessory part carrying rod is then inserted in the perforation 58 of the clamping sleeve 46, and the T-screw 72 is turned with the help of the bar 70, then the space between the toothed ring 60 and the accessory rod is shortened. If the space has been decreased in such a manner that no place remains between the T-screw 72, the accessory rod and the toothed ring 60, the clamping sleeve 46 moves away from the profiled rail. As a result, the pull rod 40 is also pulled in this direction, that is in the direction of the arrow A in FIG. 2. As a result, the clamp part 28 in FIG. 2 is again swiveled clockwise, that is with its L leg 34 clamped against the profiled rail 12. The fastening block 10 is then stopped at the profiled rail 12. One can see that, prior to tightening the T-screw by the gearing of the toothed ring 60, any rotational position of the accessory rod relative to the housing part 14 can be preselected and adjusted; this position can then be fixed in a manner which does not allow shifting by tightening the T-screw 72.

The separation of the fastening block 10 from the profiled rail 12 is carried out by again turning the T-screw 72 open, until the inserted accessory rod can be pulled out of the perforation 58. By axial pressure against the T-screw 72, the clamping sleeve 46 is shifted into the housing part 14, in a direction opposite that of the arrow A. The clamping sleeve 46 then presses against the L leg 30 of the clamp part 28, as a result of which the latter is swiveled counterclockwise in FIG. 2, that is in the opening direction. The fastening block 10 can then be lifted from the profiled rail 12, by being swiveled upward and away while the clamp part 28 is kept open.

As shown in the above description, the fixation of the fastening block 10 on the profiled rail 12 and the clamping of an accessory part can be carried out conveniently and very simply from the front by a single operational element in a single clamping process, that is the T-screw can also be easily reached. After the placement and snapping in of the fastening block on the profiled rail 12, a secure positive lock is already achieved and a certain degree of adhesive force of the fastening block 10 on the profiled rail 12 is present, acting against the shifting of the block along the rail. As a result of torques which are generated by the clamped in accessory, there is an increase in the clamping force of the fastening block on the profiled rail. Tolerances of the profiled rail 12 can be conveniently compensated by the thread for clamping the accessory. The fastening block can be conveniently released by an axial pressure on the clamping screw or T-screw 72 and simultaneous tipping away of the profiled rail 12.

Figure 3:
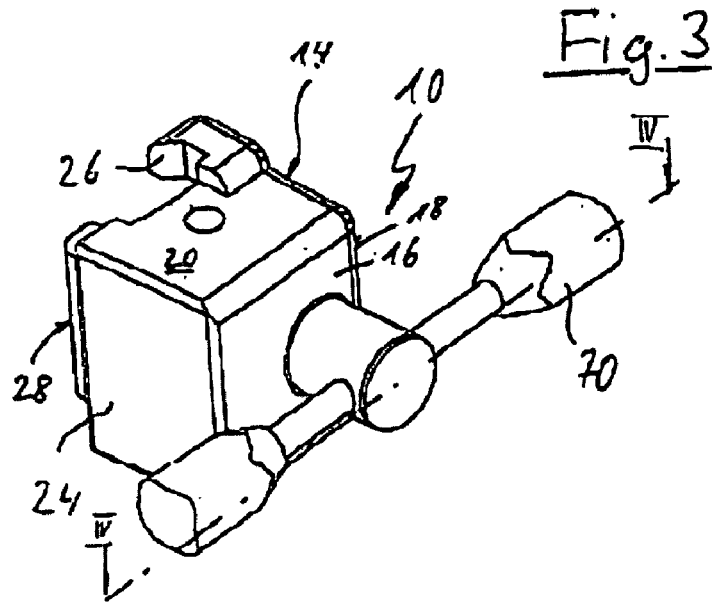
FIG. 3 shows a view corresponding to FIG. 1 of a second embodiment of the fastening block according to the invention.
Figure 4:
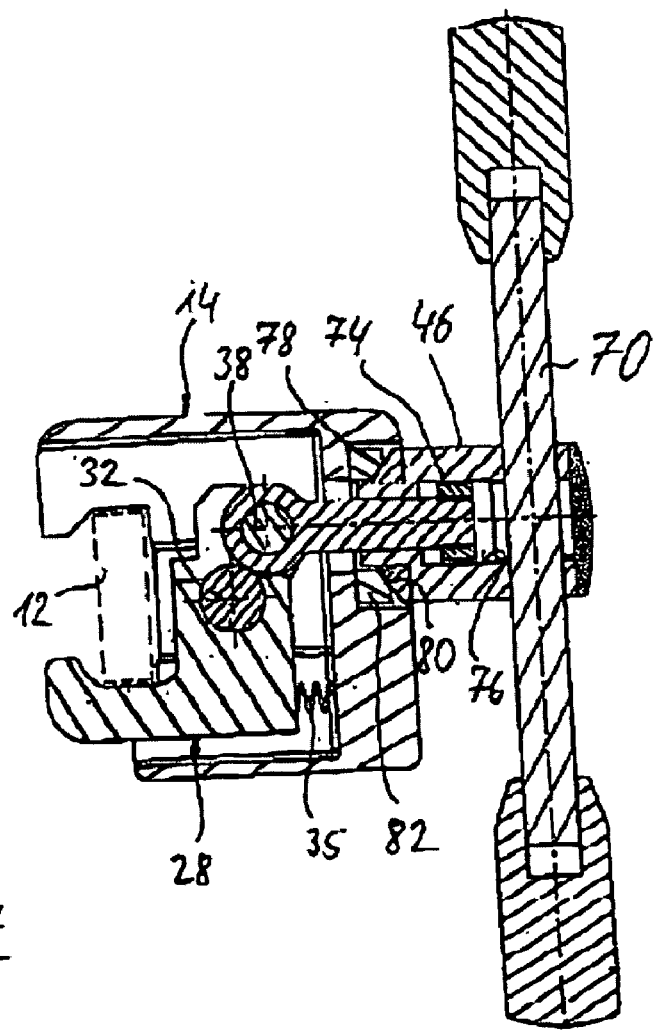
FIG. 4 shows a section corresponding to the section according to FIG. 2, through the fastening block along line IV-IV in FIG. 3.

In the fastening blocks which are represented in FIGS. 3 and 4, identical parts are again provided with identical reference numerals. This fastening block is intended for the positive connection with accessory parts, that is the accessory parts are, for example, welded to the fastening block. This fastening block differs from the embodiment according to FIGS. 1 and 2 in its clamp device.

On the free end of the pull rod 40, a ring 74 is applied, which is provided with an external thread and which engages in a threaded bore 76 in the clamping sleeve 46. The clamping sleeve 46, on its side which is turned toward the housing part 14, presents a segment of a spherical surface 78, which is applied against a ring shaped and complementarily shaped bearing surface 80 formed on a housing-attached ring 82. As a result, the clamping sleeve 46 can follow the swivel movement of the pull rod 40 during the adjustment of the clamp part 28. The application of the fastening block on the profiled rail 12 and the clamping and stopping of the clamp part 28 are carried out in the same manner as for the first above described embodiment. To remove the fastening block from the profiled rail 12, the clamping sleeve 46 which acts as T-screw, is turned in the opening direction and then pressed in the direction onto the profiled rail 12. As a result, the clamp part 28 is swiveled over the pull rod 40 in the opening position, that is counterclockwise in FIG. 4, so that the fastening block 10 can be conveniently removed from the profiled rail 12.

The invention claimed is:

1. Fastening block for mounting objects having a mounting rod on a profiled rail (12) having an at least approximately rectangular cross section, said block comprising:

(a) a housing part (14) with at least one housing-attached first claw (26), which is intended for overlapping the profiled rail (12) in such a manner that the housing part (14) with application surfaces which are parallel to the profiled rail (12) is applied against at least two surfaces of the profiled rail (12), (b) an L-shaped movable clamp part (28) having a first L leg (30) mounted within the housing part (14) in a manner so it can be swiveled about a first axis (32) which is parallel to the application surfaces and it is prestressed in a clamping position, further the movable clamp part comprises a second L leg (34), said first L leg (30) and said second L leg (34) together forming a second claw wherein the second claw is adapted to be applied to the other end of the profiled rail opposed from the first claw, (c) a clamp device (40, 46, 72) in the housing part, the clamp device is mounted on the first leg for clamping and stopping the clamp part (28) in the clamping position, wherein the clamp device comprises an actuation projection, a pull rod, and a clamping screw, (d) the actuation projection (36) which is oriented radially to the first axis (32) and connected to the first L leg (30) of the clamp part (28), (e) the pull rod (40) which is coupled to the actuation projection in a manner so it can be swiveled about a second axis (38) which is parallel to the first axis (32), wherein said pull rod extends approximately parallel to the second L leg (34), (f) the clamping screw (72), which is coupled to the clamp device to apply tension on the pull rod (40) to lock the movable clamp part in one position and the clamping screw is movable directly or indirectly on the housing part (14), said clamping screw (72) provided with a handle (70) engaging therein, (g) a clamping sleeve (46), mounted to the pull rod to guide the pull rod (40) in a manner which allows it to shift axially in a housing guide (48) which is coaxial to the pull rod axis, (h) a perforation (58) in the clamping sleeve which is oriented perpendicularly to an axis of the clamping sleeve, in a section of the clamping sleeve (46) which extends axially at least partially out of the housing part (14), (i) the clamping sleeve (46) further having an axially external end with a coaxial threaded bore (68) which intersects the perforation (58).

2. Fastening block according to claim 1, characterized in that the external end of the housing guide (48) is formed by a pipe section, in which a recess (66) is formed which is open toward the axial external end of the pipe section, and which, during an axial shift of the clamping sleeve (46) comes into a position where it covers a part of the perforation cross section.

3. Fastening block according to claim 2, characterized in that the pipe section is designed as a toothed ring (60), which surrounds the clamping sleeve (46) and which, on an end which is turned toward the housing (14), presents a toothing (62) which engages with a counter toothing (64) on the housing part (14).

4. Fastening block according to one of claims 1-3, characterized in that the pull rod (40), having a rod shaft (42) and, at at least one end, a head (44), said head being radially broader compared to the rod shaft (42), where the surface of the head which is turned toward the rod shaft (42) has the shape of a segment of a spherical surface (50) and is intended for application against a complementarily shaped bearing surface (52) of the clamping sleeve (46), which, like a ring, comprises the pull rod (40).

5. Fastening block for mounting objects on a profiled rail (12) having an at least approximately rectangular cross section, said block comprising a housing part (14) with at least one housing-attached claw (26), which is intended for overlapping on two surfaces of the profiled rail (12) in such a manner that the housing part (14) is adapted so that it can be applied against at least two surfaces of the profiled rail (12), an L-shaped movable clamp part (28) comprising a first L leg (30) which is pivotally mounted on the housing part (14) in a manner so it can be swiveled about a first axis (32) which is parallel to the application surfaces, said L-shaped movable clamp part further being prestressed in a clamping position further comprises second L leg (34) which is designed in the form of a claw, it encloses the profiled rail (12), and a clamp device (40, 46, 72) mounted in the housing part for clamping and stopping the clamp part (28) in the clamping position, the clamp device comprises an actuation projection and a pull rod, the actuation projection (36) is mounted on the first L leg (30) of the clamp part (28) such that the actuation projection (36) projects radially outward from the first axis (32), the pull rod (40) is coupled to the actuation projection in a manner which allows swiveling about a second axis (38) which is parallel to the first axis (32), which pull rod extends approximately parallel to the second L leg (34), and furthermore the clamp device comprises a clamping screw (72), the clamping screw applies tension on the pull rod (40) to lock the movable clamp part in one position and the clamping screw is movable directly or indirectly on the housing part (14), wherein the clamping screw is in direct threaded engagement with the pull rod (40), and the clamping screw comprises a threaded sleeve (46) which is rotatably braced on the housing part (14) and provided with a handle (70) and which has an internal thread (76) that engages an external thread (74) of the pull rod (40).

6. Fastening block according to claim 5, characterized in that the support surface of the threaded sleeve (46) is designed in the shape of a segment of a spherical surface (78), which is applied against a complementarily shaped bearing surface (80) of the housing part (14).

\* \* \* \* \*